June 28, 1966   W. E. RAPSILBER   3,258,770
RADAR TARGET SIMULATOR
Filed April 16, 1964   2 Sheets-Sheet 1

INVENTOR.
WILLIAM E. RAPSILBER
BY C. E. Vautrain Jr. AGENT
George J. Rubens ATTORNEY (a) SPIN REFERENCE (b) ANTENNA TO RIGHT OF TARGET (c) ANTENNA TO LEFT OF TARGET (d) ANTENNA ABOVE TARGET (e) ANTENNA BELOW TARGET (f) ANTENNA CENTERED ON TARGET United States Patent Office 3,258,770
Patented June 28, 1966

3,258,770
RADAR TARGET SIMULATOR
William E. Rapsilber, St. Louis, Mo., assignor, by mesne assignments, to the United States of America as represented by the Secretary of the Navy
Filed Apr. 16, 1964, Ser. No. 360,465
2 Claims. (Cl. 343—17.7)

The present invention relates in general to target simulating methods and equipment and more particularly to a method and apparatus for producing a simulated video target which is movable in three dimensions and is capable of radar tracking.

Altough target simulating equipment has been in use for a number of years, such equipment is made to operate independently of installed equipment or requires that exceedingly complex circuits and components be incorporated in existing systems for satisfactory operation. In contrast, the video radar target simulator of the present invention is adaptable to any rotated-beam search and track radar such as the conical scan radar, and when connected therewith may be used for radar demonstration and tactical instruction or for operational checkout of the radar system. In such use, the circuit of the present invention is connected directly to the video channel of a radar receiver, or may be connected to standard microwave test gear to give an R.F. simulated target. The embodiment shown includes vacuum tubes, however, the present invention is applicable to transistor operation, with appropriate component modifications, within the inventive concept.

Accordingly, it is an object of the present invention to provide a method of and apparatus for forming a radar target positioning gate in installed radar equipment to permit the production of a simulated radar video target movable in three dimensions.

It is a further object of the present invention to provide a method of and apparatus for achieving simulated radar video targets which is adaptable to any conical scan or other type of beam search and track radar.

It is a still further object of this invention to provide in a radar target simulating system tracking modulation and gate former circuits which achieve an isolated target positioned relative to an antenna boresight axis and produce target modulation for tracking information that needs no positioning adjustment.

Other objects and many of the attendant advantages of this invention will be readily appreciated as the same becomes better understood by reference to the following detailed description when considered in connection with the accompanying drawings wherein.

Figure 1:
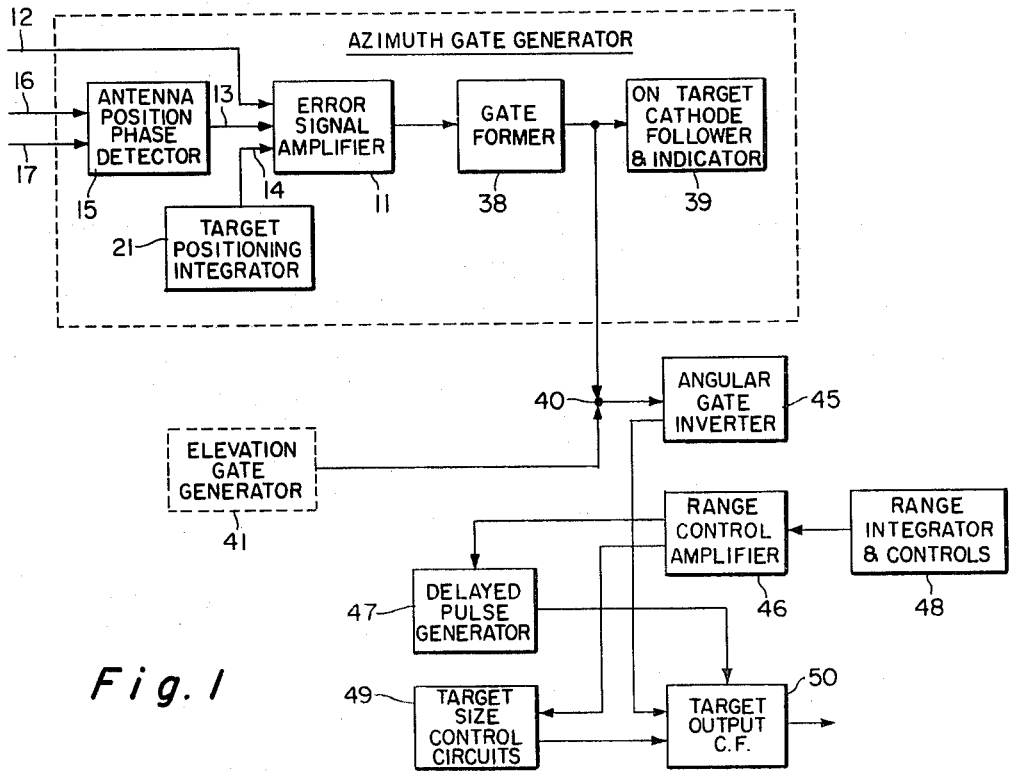
FIGURE 1 is a block diagram of the operative components of the invention.

Referring to FIGURE 1, the azimuth gate generator of the present invention is shown as including error signal amplifier 11 which has three inputs, a low frequency A.-C. signal substantially less than 400 cycles/second, representing conical spin reference position indicated at 12, a D.-C. signal representing radar direction or azimuth indicated at 13, and a D.-C. signal representing the azimuth of a simulated target indicated at 14. The conical spin reference signal is derived from the search beam or tracking radar of the installation being used, while the radar azimuth D.-C. signal 13 is the output of antenna position phase detector 15. The phase detector 15 translates a 400 cycle reference A.-C. voltage signal 16 and a radar direction or azimuth signal 17 to a proportional error signal. Detector 15 includes a bridge demodulator, not shown, which accomplishes the translation by phase detection in a manner well known in the art. The simulated target azimuth signal is derived by target position integrator 21 from a conventional resistor-selector network, not shown, which generates a D.-C. "ramp" voltage whch is proportional to the azimuth of a simulated (imaginary) moving target. The D.-C. signals 13 and 14 are summed and fed into error signal amplifier 11, with the resultant signal being used to form the azimuth gate former 38 in the manner described in connection with the discussion infra of FIGURE 2. Azimuth gate indicator 39 presents a visual indication when the simulated target is within the cone of the search beam or tracking radar being used. Imposed upon the summed D.-C. signals 13 and 14 is the low frequency A.-C. signal 12 whose function will be described infra.

An elevation gate generator, 41, is also included, but since the inputs thereinto are equivalent to those of the azimuth gate generator, and the components of each generator are identical, the elevation gate generator is shown only generally as block 41. The azimuth gate and the elevation gate signals are combined at 40 and the resulting signal fed into angular gate inverter 45 where both gates are inverted. The elevation spin reference signal is shifted in phase ninety degrees with respect to the azimuth spin reference signal. The combined azimuth and elevation gate signals control the gating and amplitude of the simulated target range pulses. Range control amplifier 46 supplies a D.-C. range control signal to delayed pulse generator 47 from which the basic target video signal is obtained. A second output from range control amplifier 46 determines the target amplitude inversely with range through the target size control circuits 49. Range control amplifier 46 is driven by range integrator and control 48. The target amplitude is determined through target size control circuits 49 by manual and by D.-C. range voltage from amplifier 46. The size control signal is a negative D.-C. bias combined with the target gate signal and applied to the grid of output cathode follower 50. The target range video pulses from pulse generator 47 are also applied to the grid of tube 50. The negative bias at the grid of tube 50 holds the tube below cutoff except when the azimuth and elevation gates and target range pulses are present simultaneously. Then video pulses appear at the output of cathode follower 50 at an amplitude determined by the negative grid bias and gate error signal. In addition to this gate control function, target output cathode follower 50 provides impedance matching to prevent loading of the circuits.

Figure 2:
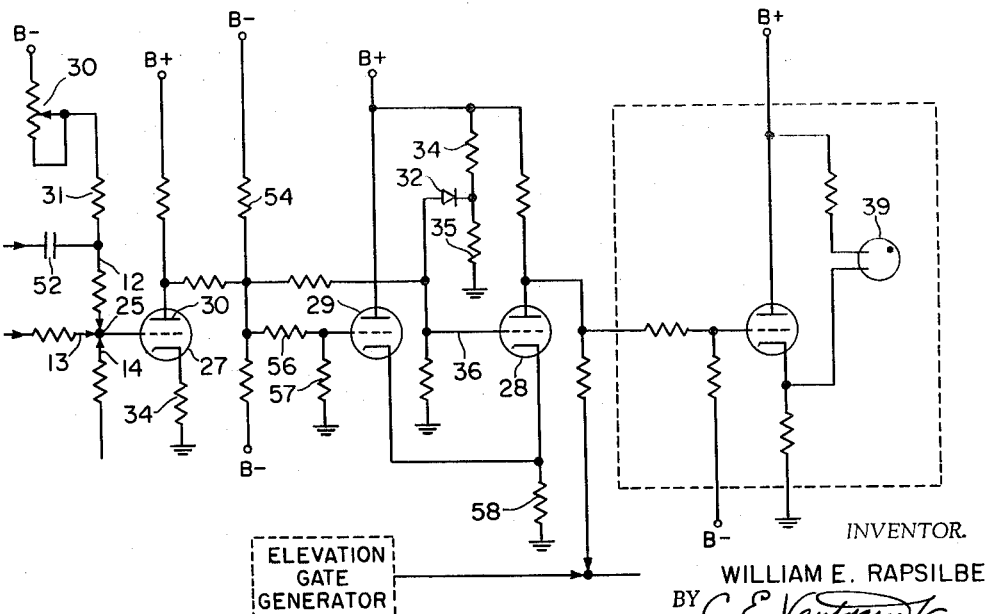
FIGURE 2 is a partial circuit diagram of one embodiment of the invention.

In FIGURE 2, inputs 12, 13 and 14 are shown passing through point 25 with the voltage signal resulting from inputs 13 and 14 controlling the grid of D.-C. amplifier 27. This control signal, i.e. the antenna target error signal, is thus a summation of the D.-C. antenna position signal and the negative of the selected target position. Negative bias is obtained through a target boresight adjustment which is brought in through potentimeter 30 and resistor 31 and reduces the positive error signal to the operating level of amplifier 27. Amplifier or tube 27, with some negative feedback introduced by resistor 34, in this embodiment has a gain of approximately thirty-five. Input 12 becomes a ripple signal which is superimposed on the antenna target error signal. This ripple signal is shown superimposed on the signal in FIGURE 3 which occurs when the antenna is centered on the target. Gate former 38 includes tubes 27 and 28, with tube 27 operating only when the error signal on the grid of tube 27 is near zero. Tube 27 is cut off or saturated at all error signals in excess of ±1.5 volts from the reference point of around −1 volt. The center 30 volts of the amplified error signal is used to form the gate which allows target pulses to be presented to the radar. Neon indicator 39 indicates when the target is within the cone formed by the radar beam, i.e. with the radar spin reference signal.

Both of tubes 28 and 29 receive an output from the plate 30 of error signal amplifier tube 27. Tube 29 receives less than two-thirds of the signal applied to tube 28, and the grid voltage of tube 28 is limited to 13 volts. Tube 27 thus operates across the widest band and effectively controls the cathode of tube 28. Voltage dividers 34 and 35 form a grid voltage limiter circuit for tube 28 which limits the grid 36 of tube 28 from increasing in voltage to more than approximately +13 volts.

Figure 3:
FIGURE 3 shows the waveforms at various relative target and antenna positions.
Figure 3:
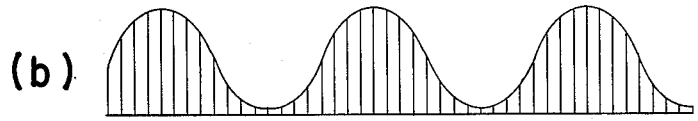
Figure 3:
Figure 3:
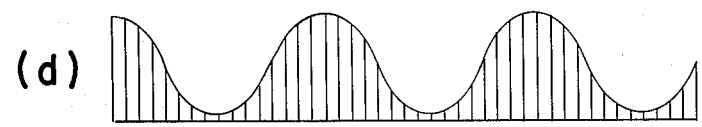
Figure 3:
Figure 3:

In FIGURE 3, the reference signal is indicated at (a), while (b) indicates the wave form or pulse output with the antenna to the right of the target, (c) with the antenna to the left of the target, (d) with the antenna above the target, (e) with the antenna below the target and (f) with the antenna centered on the target. It is noted that (b) is in phase with (a), (c) is 180 degrees out of phase with (b) and that (d) and (e) are 90 degrees out of phase with (a) and (b).

In order for the antenna to track the target position set by the simulator, the target pulses must be amplitude modulated with the proper phases of the radar spin reference signal. The antenna gate voltage determines target pulse amplitude, and when the gate position is vibrated by the spin reference signal a ripple or pulse amplitude is impressed on or follows the reference. This ripple signal or modulation is in phase with the reference when the antenna is slightly right of the target, and 180° out of phase when the antenna is slightly left of target center. That is, the ripple signal has effect on the gate only when the simulated target position is at the edge of radar spin reference signal. When in such position, either peaks or valleys are detected giving positive or 180 degrees from positive readings. The elevation spin reference signal is shifted 90 degrees from the azimuth so that, when the two gates are summed together, the modulation effect is the same as if one gate were rotating about the zero error point in a manner similar to the radar beam nutating around a target. The ripple or vibration of the gate is provided by applying the spin reference signal to the grid of tube 27 through capacitor 52. It will be noted that a similar result may be realized by applying the spin reference signal to the cathode of tube 27 through a resistor, not shown. Potentiometer 30 is used to adjust the level of modulation in the embodiment shown herein. The parameters of the circuit are such that less than ¼ volt applied to the grid of tube 27 will produce a sufficient A.-C. component in the error signal for proper tracking.

The operation of the gate former 38 may be understood by considering the amplified error signal at the plate of tube 27 rising from below 50 volts to more than 100 volts as the antenna passes through the target position from right to left, for example. This rising voltage is summed with negative bias through resistor 54 and applied to the grids of both tubes 29 and 28, with tube 29 receiving less than ⅔ of the voltage applied to tube 28 because of the voltage divider incorporating resistors 56 and 57. Tubes 28 and 29 are cathode-coupled through resistor 58. With a greater signal supplied on the grid of tube 28 than on its cathode, tube 28 amplifies the rising error signal as soon as it comes within operating range of the tube. In the embodiment shown, the operating range occurs when there is about 65 volts at the plate of tube 27, at which point tube 28 comes out of cut-off. When out of cut-off, the plate voltage of tube 28 drops suddenly towards a saturation point of about 70 volts as the error signal continues to rise. To this point, diode 32 starts to conduct, for its anode voltage comes up above its cathode voltage (+13 volts) set by voltage divider, resistors 34 and 35. The point at which diode 32 starts to conduct may be referred to as the gate center, or maximum dip in voltage, although the true gate center, i.e. zero error signal, is slightly to the right. With diode 32 conducting, the grid of tube 28 holds constant while the voltage supplied to tube 29 is affected by a factor of about ½. Hence, the cathode signal from tube 29 continues to rise. The cathode signal, then, is that which is amplified without phase reversal, and the gate voltage rises sharply to the cut-off point again, and remains there as the error signal increases further.

When the antenna moves from left to right, the gate forming process is repeated in reverse. The process is D.-C. in operation and may be stopped at any point of target-antenna relationship to hold a fixed gate voltage. Either the azimuth or the elevation gate may be present, independent of the other, but both must occur at the same time before the range pulses are gated "on." Neon indicator 39 may be provided to show the presence of the azimuth gate, and a separate indicator, not shown, may be provided to show the presence of the elevation gate. When the presence of both gates is indicated the antenna is on target. The output of the present electronic radar target simulator is a rectangular pulse nominally microseconds in width and several volts in amplitude. The pulse is synchronized with the radar trigger and has the same repetition frequency as the trigger. This pulse appears to the radar tracking circuits and on the radar indicator as a realistic target.

Among the major advantages of the present invention are its use of simple, reliable circuits to achieve an isolated target positioned relative to the antenna boresight axis, and to produce target modulation for tracking information which needs no positioning adjustment. That is, the modulation signal alignment is inherently correct, independent of amplifier drift, and cannot become misaligned. The basic circuit, when combined with conventional target and countermeasure generating circuits and adapted to a particular radar system, produces an extremely efficient and versatile low cost and test set. The resulting video output has all the characteristics of a live distant moving target. The target may be positioned within broad limits anywhere in three dimensional space with respect to the radar under test. Automatic linear motion may be imparted to the target at various rates to move it in either direction from the selected position within the limits of each plane. The target is modulated with the radar rotation frequency so that it can be locked onto and tracked. In this process, the radar antenna follows the target motion in azimuth and elevation just as if a real target were present. If the antenna is not looking exactly at the selected target position, no signal will appear on the indicator and lock-on is impossible. The simulator supplies the target output in two isolated channels.

By the above method and means, there is provided a compact, relatively simple video radar target simulator which is adaptable to any conical scan or differently-rotated beam search and track radar. The method and device described may be used for radar operating demonstration, training or for operational checkout of the radar system. Its general principles of operation are adaptable to more precise circuitry which may be used to calibrate range, range rate, antenna angle, angular rate or miximum tracking capabilities of a radar system within the concept of the invention.

It will be recognized that many modifications and variations of the present invention are possible in the light of the above teachings. It is therefore to be understood that within the scope of the appended claims the invention may be practiced otherwise than as specifically described.

I claim:
1. The method of adapting installed radar systems to present simulated moving targets comprising the steps of:
    providing input signals representative of simulated target motion in azimuth and elevation;
    combining antenna azimuth and simulated target azimuth information into a first grid control signal;

combining antenna elevation and simulated target elevation information into a second grid control signal;
superimposing on said first and second grid control signals a signal representative of radar beam conical reference;
displacing said first and second grid control signals ninety degrees out of phase;
controlling the grids of respective vacuum tubes receiving said first and second signals so as to form one end of a gate signal;
controlling the cathodes of said vacuum tubes so as to form the other end of a gate signal; and
combining the respective gate signals to form a target signal gate whereby target signals are permitted to pass when said gate signals are in coincidence, and target error to the right or left of the radar beam cone is indicated by in-phase or out-of-phase relationship of gate motion with respect to one phase of the radar beam conical reference signal; and target error above or below the radar beam cone is indicated by in-phase or out-of-phase relationships of gate motion with respect to the 90 degree phase of the conical reference signal.

2. The method of employing installed radar systems to simulate moving targets comprising the steps of:
summing a D.-C. antenna azimuth position signal with the negative of a selected azimuth target position signal to develop an antenna azimuth target error signal;
amplifying the antenna azimuth target signal;
forming a first gate with a selected portion of the amplified antenna azimuth target error signal to allow target pulses to be presented to the radar;
amplitude modulating the target pulses with selected phases of the radar azimuth spin reference signal to permit the antenna to track the target azimuth position set by a simulator;
vibrating the first gate position by the spin reference signal so that target pulse amplitude will follow the radar spin reference signal;
deriving a D.-C. antenna elevation target error signal in the same manner as the antenna azimuth target error signal was developed;
shifting the antenna elevation spin reference signal ninety degrees from the antenna azimuth spin reference signal;
forming a second gate with a selected portion of the amplified elevation target error signal; and
summing the first gate and the second gate;
so that the modulated target azimuth pulse amplitude is in phase with the azimuth spin reference signal when the antenna is slightly to the right of target center and is 180 degrees out of phase when the antenna is slightly to the left of target center, and when the first gate and the second gate are summed together the combned modulation effect is as if one gate were rotating about the zero error point in a manner similar to a radar beam nutating around an actual target.

References Cited by the Examiner

UNITED STATES PATENTS 2,876,447   3/1959   Witten et al. _____ 343—17.7

OTHER REFERENCES

Krakauer et al.: Modular Simulator Tests Missile Radar, In Electronics, July 1955, pages 127–129.

LEWIS H. MYERS, *Primary Examiner.*

CHESTER L. JUSTUS, *Examiner.*

R. E. KLEIN, R. D. BENNETT, *Assistant Examiners.*